(12) United States Patent
Brunick et al.

(10) Patent No.: US 8,632,127 B2
(45) Date of Patent: Jan. 21, 2014

(54) CHILD SAFETY SEAT WITH HEIGHT ADJUSTABLE HARNESS

(75) Inventors: Daniel Brunick, East Earl, PA (US); Ira Rubien, Malvern, PA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/141,732

(22) PCT Filed: Dec. 23, 2009

(86) PCT No.: PCT/US2009/069447
§ 371 (c)(1),
(2), (4) Date: Sep. 7, 2011

(87) PCT Pub. No.: WO2010/075531
PCT Pub. Date: Jul. 1, 2010

(65) Prior Publication Data
US 2011/0309663 A1  Dec. 22, 2011

Related U.S. Application Data

(60) Provisional application No. 61/140,366, filed on Dec. 23, 2008.

(51) Int. Cl.
*A47D 1/10* (2006.01)
(52) U.S. Cl.
USPC ...................................................... 297/250.1
(58) Field of Classification Search
USPC ................ 297/250.1, 410, 216.11, 484
See application file for complete search history.

(56) References Cited

U.S. PATENT DOCUMENTS

| 3,910,634 | A | * | 10/1975 | Morris | 297/467 |
| 4,790,601 | A | | 12/1988 | Burleigh et al. | |
| 5,054,853 | A | * | 10/1991 | Gillies et al. | 297/250.1 |
| 6,155,638 | A | | 12/2000 | Bapst | |
| 6,491,348 | B1 | * | 12/2002 | Kain | 297/484 |

(Continued)

FOREIGN PATENT DOCUMENTS

| DE | 20 2008 000987 | 5/2008 |
| EP | 326 265 | 8/1989 |
| EP | 1 516 775 | 3/2005 |

(Continued)

OTHER PUBLICATIONS

International Search Report and Written Opinion issued in corresponding International application No. PCT/US2009/069447.

*Primary Examiner* — Milton Nelson, Jr.
(74) *Attorney, Agent, or Firm* — Lempia Summerfield Katz LLC

(57) ABSTRACT

A child safety seat has a seat back (16) with an upper end (28), a lower end, a back side, and a front side (26). A harness (50) has a pair of shoulder straps (58) each having a portion positioned forward of and extending along the front side. A headrest (32) is coupled to the seat back near the upper end and has a bottom (40). The vertical position of the headrest is selectively adjustable along the seat back between a raised and a lowered position. A strap router (112) on the seat back directs the shoulder straps from the back side toward the front side. The shoulder straps are directed under the bottom (40) of the headrest. By selectively adjusting the headrest vertical position, the bottom (40) of the headrest adjusts the vertical position of the shoulder straps on the front side of the seat back by increasing or decreasing the useable length.

11 Claims, 6 Drawing Sheets

(56) References Cited

U.S. PATENT DOCUMENTS

| | | |
|---|---|---|
| 6,623,074 B2 | 9/2003 | Asbach et al. |
| 6,688,685 B2 | 2/2004 | Kain |
| 6,779,843 B2 | 8/2004 | Kain |
| 7,246,854 B2 | 7/2007 | Dingman et al. |
| 2011/0133532 A1* | 6/2011 | Zhao .......... 297/250.1 |

FOREIGN PATENT DOCUMENTS

| | | |
|---|---|---|
| EP | 1 762 424 | 3/2007 |
| JP | 58 194928 | 12/1983 |

* cited by examiner

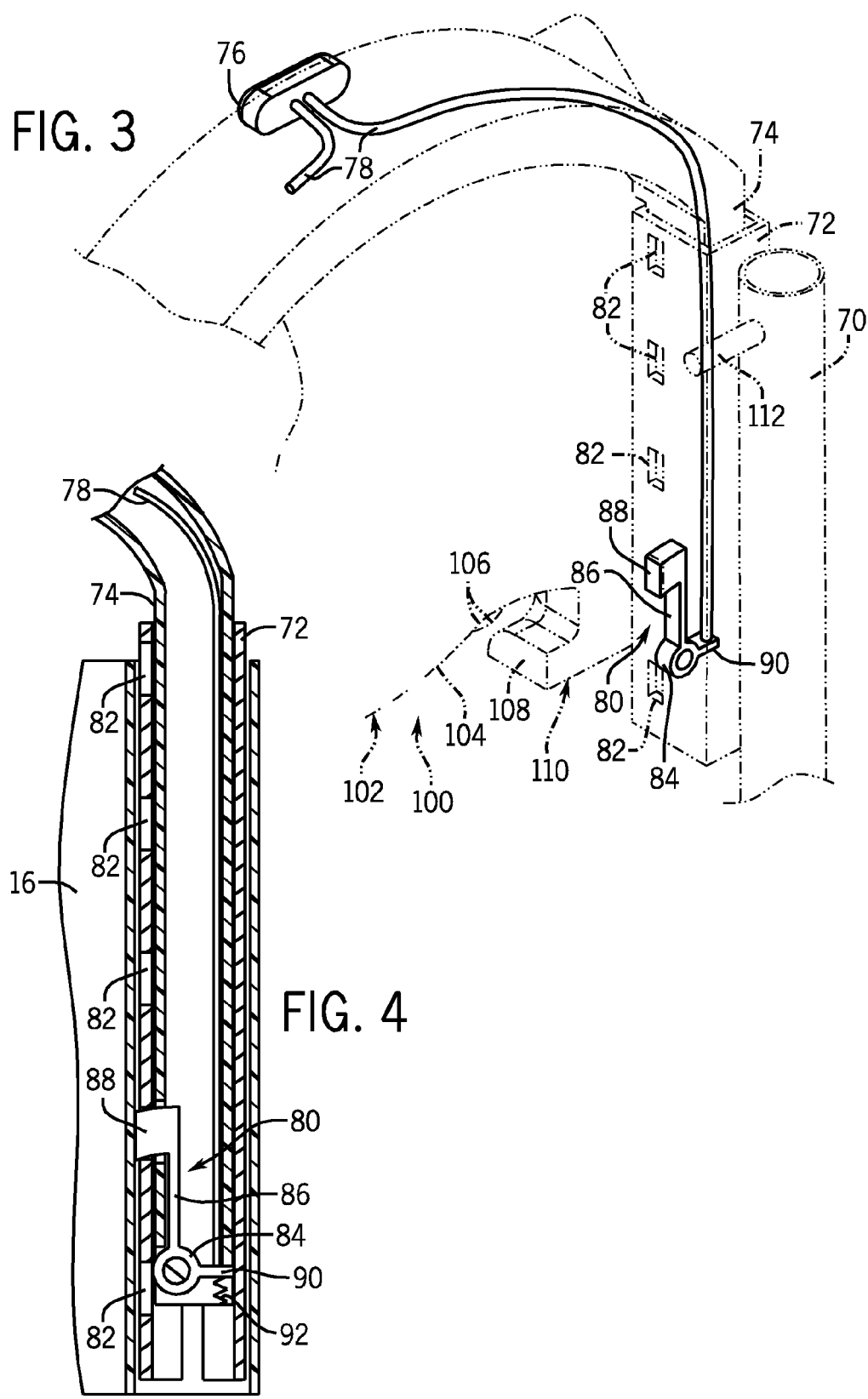

CHILD SAFETY SEAT WITH HEIGHT ADJUSTABLE HARNESS

RELATED APPLICATION DATA

This is a U.S. national phase application based on International Application Serial No. PCT/US2009/069447 filed on Dec. 23, 2009 and entitled "Child Safety Seat With Height Adjustable Harness", which is related to and claimed priority benefit of U.S. provisional patent application Ser. No. 61/140,366 filed on Dec. 23, 2008 and entitled "Integrated Headrest and Harness Height Adjustment for a Child Safety Seat." Priority benefit of each of these earlier filed applications is hereby claimed, and the full disclosures of each of these earlier filed applications are hereby incorporated by reference herein.

BACKGROUND

1. Field of the Disclosure

The present invention is generally directed to child safety seats, and more particularly to a child safety seat with a height adjustable harness.

2. Description of Related Art

Child safety seats, or car seats, are well known for placement on a vehicle seat in order to safely position, secure, and restrain a child in the vehicle. Child safety seats are also well known to employ an on-board or dedicated harness system. A typical five-point harness system often employs a crotch strap, a pair of lap belts, and a pair of shoulder straps. The various straps and belts are connected to one another at a latch or buckle. The length of the various straps and belts is adjustable in order to accommodate children of different size and to accommodate a growing child.

One problem with such harness systems is that the shoulder strap height, or harness height, can be difficult to adjust or reposition in order to accommodate children of different height. As a child grows, the shoulder strap height should be raised in order to safely and comfortably restrain the child. A number of seat manufacturers have attempted to address this problem. Unfortunately, such harness systems on such child safety seats are often still difficult to adjust and operate. This can discourage a user of the seat from making the necessary adjustments when needed.

Many child safety seats employ slots in the seat back through which the shoulder harness straps are routed. Height adjustment is accomplished by selecting the appropriate slots and threading the harness webbing through the selected slots. However, a user must uninstall and then reinstall the harness when adjusting the harness height. This can be difficult for the user because the seat has to be removed from the vehicle and then turned over in order to access the harness. The harness must then be withdrawn from the current pair of slots and only then can the webbing be rerouted or threaded through a different pair of selected slots. The seat must then be reinstalled in the vehicle, which can require re-anchoring the seat to the vehicle seat anchors. Making this task even more difficult is that the slots in the seat back are often covered by soft goods or other seat components. The slots also are often quite small in size. The user must locate and identify the correct slots and then manipulate the webbing of the straps through the correct slots.

A number of car seats with another type of harness height adjustment solution are available in the market place. Manufacturers such a Cosco, Evenflo, Britax, and Indiana Mills have attempted to address the above-noted problems by modifying the slot-based approach to harness height adjustment. Such seats have harness straps that are fed through slots in a control panel or other structure of the seat before reaching the seating area. The harness straps remain engaged with the slots of the harness control panel or other structure during and after the harness height adjustment. The control panel or other structure moves along the seat back surface in order to reposition the harness straps. The control panel is typically coupled to a part of the seat back and can be difficult to access because it is hidden beneath the seat soft goods, is covered by structures of the seat back, and the like. Use of the control panel approach also renders height adjustment, manufacturing, assembling, and cleaning of the seat, as well as other operations involving the harness straps more difficult and complex. The control panel approach increases the complexity of the car seat, which increases the cost and complexity of manufacturing, and assembling the seats.

The known child safety seats with height adjustable harness systems also typically require that the harness latch and/or the harness tension mechanisms be actuated or disengaged before adjusting the height of the harness. These known solutions also complicate the design and implementation of soft goods onto the child safety seat. This can make it more difficult for a consumer to remove the soft goods for cleaning and can make it more difficult to reinstall the soft goods on the seat.

SUMMARY

In one example according to the invention, a child safety seat has a seat back with an upper end, a lower end, a back side, and a front facing side. A seat harness has a pair of shoulder straps each with a strap portion positioned forward of and extending along the front facing side of the seat back. A headrest can be coupled to the seat back near the upper end and can have a bottom. The vertical position of the headrest can be selectively adjustable relative to the seat back between a raised position and a lowered position. A strap router on the seat back can direct the pair of shoulder straps from the back side toward the front facing side. The pair of shoulder straps can be directed under the bottom of the headrest. By selectively adjusting the vertical position of the headrest, the bottom of the headrest can adjust the vertical position of the pair of shoulder straps on the front facing side of the seat back by increasing or decreasing the useable length of the strap portions.

In one example according to the invention, a child safety seat can have a strap router that is positioned above a top end of the seat back.

In one example according to the invention, a child safety seat can have a strap router that is a transverse part positioned adjacent to the back side of the seat back.

In one example according to the invention, a child safety seat can have a strap router that is a bar that extends between a pair of seat frame supports on the back side of the seat back.

In one example according to the invention, a child safety seat can have a gap created between a top end of the seat back and the bottom of the headrest in a maximum raised headrest position. The pair of shoulder straps can be directed through the gap.

In one example according to the invention, a child safety seat can have a strap guide region on the bottom of the headrest with a contoured profile defining a pair of upwardly recessed sections flanking a depending mid-section.

In one example according to the invention, a child safety seat can have a pair of strap guides positioned laterally spaced apart from one another on the bottom of the headrest.

In one example according to the invention, a child safety seat can have a pair of strap guides, each having a boss spaced from and under an upward recess in the bottom of the headrest. The bosses can protrude laterally inward toward one another with a gap therebetween.

In one example according to the invention, a child safety seat has a seat back with an upper end, a lower end, and a front facing side. A seat harness has a pair of shoulder straps each with a strap portion extending along the front facing side. A headrest can be coupled to the seat back near the upper end and can have a bottom and a strap guide region on the bottom. The vertical position of the headrest can be selectively adjustable relative to the seat back between a raised position and a lowered position. A strap router on the seat back can direct the pair of shoulder straps from the back side toward the front facing side of the seat back. The pair of shoulder straps can be routed to the strap guide region whereby selectively adjusting the vertical position of the headrest can adjust the vertical position of the pair of shoulder straps on the front facing side. The pair of shoulder straps can be optionally moved laterally and downwardly out of engagement with part of the strap guide region to selectively allow raising the headrest independent of the pair of shoulder straps.

In one example according to the invention, a child safety seat can have a strap guide region with a contoured surface on the bottom of the headrest. The contoured surface can have a depending mid-section and a pair of upward recesses flanking the mid-section.

In one example according to the invention, a child safety seat can have a strap guide region with a pair of bosses spaced from a bottom surface of the headrest. The pair of bosses can extend toward one another but have a gap therebetween. The pair of shoulder straps can be routed over the corresponding bosses.

In one example according to the invention, a child safety seat can have a strap guide region with a contoured surface having a pair of spaced apart upward recessed sections. One of the recessed sections can be positioned above each of the pair of bosses.

In one example according to the invention, the seat back of a child safety seat can have a back side and a strap router that positioned near the upper end of the seat back on the back side.

In one example according to the invention, a child safety seat can have a strap router that is a bar extending laterally across a back side of the seat back.

In one example according to the invention, a child safety seat can have a strap router that directs the pair of shoulder straps over a top end of the seat back and under the bottom of the headrest.

In one example according to the invention, a child safety seat can have a headrest that is adjustable to one or more intermediate positions between the raised and lowered positions.

In one example according to the invention, a height adjustable harness system for a juvenile product with a seat can include a seat back with an upper end, a lower end, and a front facing side. A seat harness can have a pair of shoulder straps each with a portion positioned forward of and extending along the front facing side of the seat back. A headrest can be coupled to the seat back near the upper end and can have a bottom. The vertical position of the headrest can be selectively adjustable relative to the seat back between a raised position and a lowered position. A strap router can be maintained at a fixed elevation relative to the seat back and can direct the pair of shoulder straps toward the front facing side. The pair of shoulder straps can be routed under the bottom of the headrest. By selectively adjusting the vertical position of the headrest, the bottom of the headrest can adjust the maximum useable height of the pair of shoulder straps on the front facing side of the seat back.

BRIEF DESCRIPTION OF THE DRAWINGS

Objects, features, and advantages of the present invention will become apparent upon reading the following description in conjunction with the drawing figures, in which:

FIG. 3 shows a rear fragmentary perspective view, partly in phantom, of one example of a headrest latch and release mechanism.

FIG. 4 shows a cross-section along line IV-IV of a portion of the latch and release mechanism shown in FIG. 7.

DETAILED DESCRIPTION OF THE DISCLOSURE

The present disclosure is generally directed to a child safety seat or car seat that employs a height adjustable harness system. The disclosed child safety seat solves or improves upon one or more of the above noted and/or other problems and disadvantages with prior known safety seats of this type. In one example, the disclosed child safety seat has an adjustable headrest, which when positioned to a selected height relative to the seat back also repositions or alters the usable length of the shoulder strap portions of the harness system. The shoulder straps are routed or directed to a front facing side of the seat back at a height position that can be altered or adjusted simply by raising or lowering the headrest. In one example, a portion of the headrest directs shoulder straps on the front facing side of the seat back and that portion is height adjustable relative to the seat back. In one example, the shoulder straps are guided by, but not attached or affixed to, the headrest. The disclosed child safety seat can improve the ease of use, ease of cleaning, and ease of assembly of the seat and harness system. The disclosed child safety seat also can simplify the construction and use of such seats as well as improve the design and handling of soft goods on the seat. The disclosed child safety seat also can simplify or improve the process of reconfiguring the child safety seat between a harness mode, in which the dedicated harness system is utilized, and a booster mode, in which the dedicated harness system is not utilized and/or removed and in which the vehicle's restraint belt is utilized to secure a child in the seat.

Figure 1:
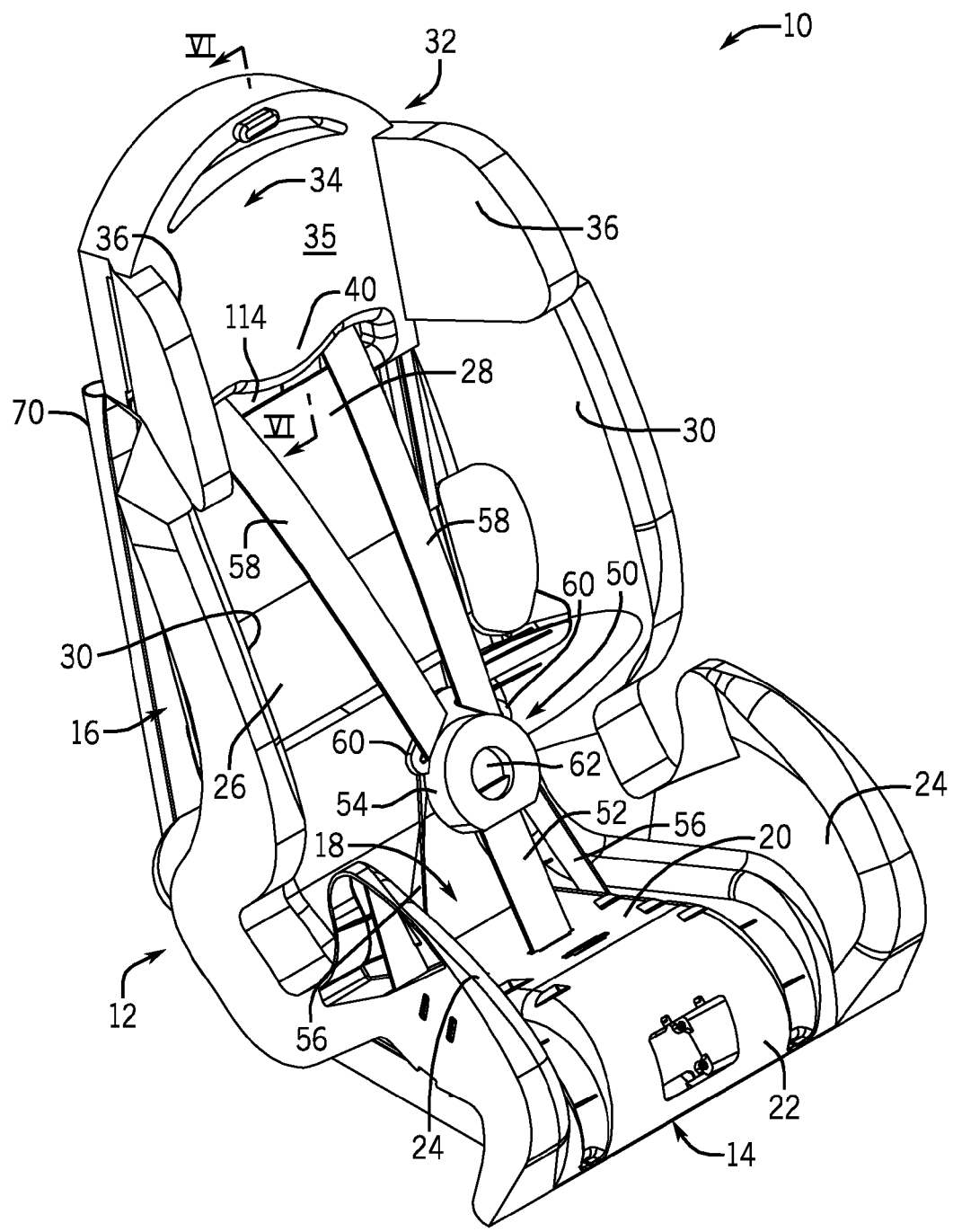
FIG. 1 shows one example of a child safety seat constructed in accordance with the teachings of the present invention and with the harness system adjusted to a maximum height.

Referring now to the drawings, FIG. 1 shows a front perspective view of one example of child safety seat 10 constructed in accordance with the teachings of the present invention. In this example, the child safety seat 10 generally has a seat shell 12 of a unitary construction. The seat shell 12 generally has a seat bottom 14 joined to a seat back 16 at a seat bight region 18. The seat bottom 14 has a top or upward facing side 20, a front end 22, and a pair of upwardly extending side walls 24, which project upward from opposite sides of the seat bottom. The seat back 16 has a front facing side 26, an upper end 28, and a pair of side bolsters 30, which project forward from opposite sides of the seat back. The seat bottom 14 has a rear end and the seat back 16 has a lower end, which are joined integrally with one another at the seat bight 18 in this example.

As will become evident to those having ordinary skill in the art upon reading this disclosure, the particular configuration and construction of the various aspects of the seat shell 12 can vary within the spirit and scope of the present invention. The shape, size, and configuration of the various aspects of the seat shell 12 can deviate from the example shown and described herein. In the disclosed example, the seat shell 12 can be a plastic, molded, unitary construction. In another example, the seat shell components can be separately formed and attached or connected to one another to form the seat shell 12, can be made of other materials, and/or can be formed using other suitable processes.

In this example, the child safety seat 10 has a headrest 32 connected to the upper end 28 of the seat back 16. The headrest 32 in this example has a head support section 34 with a front facing surface 35 positioned between a pair of side wings 36. The side wings project forward from the side edges of the head support section 34. The headrest 32 also has a top 38 and a bottom 40. The front facing surface 35 faces forward in the same direction as the front facing side 26 on the seat back 16.

As with the seat shell 12, the configuration and construction of the headrest 32 can also vary considerably within the spirit and scope of the present invention. The various aspects of the headrest 32 can deviate from the example shown and described herein. The headrest 32 can also be a molded, plastic, unitary construction or can be formed as subcomponents and assembled afterwards. The size, shape, and configuration of the various aspects of the headrest 32 can also be altered without departing from the spirit and scope of the invention.

The seat shell 12 is depicted herein without any soft goods in order to more easily illustrate the features and functionality of the present invention. In a typical example, a seat pad would be installed over the seat shell 12 and have a portion resting on the seat bottom 14 and the seat back 16. The seat pad would define a seating surface on or against which an occupant would rest during use of the safety seat. The seat pad can have multiple layers including combinations of decorative fabric layers, durable fabric layers, comfortable fabric layers, padding, wadding, tufting, and the like. Similarly, the headrest 32 is shown herein without any soft goods, but can include same.

The child safety seat 10 in this example has an on-board or dedicated harness system 50 that is configured to secure an occupant in the seat during use. In the disclosed example, the harness system 50 has a crotch strap 52 extending up from the seat bottom 14. A buckle housing 54 is connected to the free end of the crotch strap 52. The harness system 50 also has a pair of continuous straps that, when installed, form a pair of lap belts 56 that also project up from the seat bottom 14 near the side walls 24. The lap belts continue into a pair of shoulder straps 58 that are positioned forward of the front facing side 26 of the seat back 16 and extend therealong. In this example, a buckle connector 60 is slidably received on each of the continuous straps. The position of the connector 60 defines the separation between each lap belt 56 and respective shoulder strap 58 when the harness system is installed. The connectors 60 latch to the buckle housing as shown and an actuator 62 on the housing can release the connectors.

The harness system 50 as disclosed herein is essentially a conventional harness system, other than as described below with respect to the height adjustment aspect of the invention. Various features of the harness system 50 including the configuration and construction of the buckle housing 54, the buckle connectors 60 the actuator 62, and the various straps and belts can vary within the spirit and scope of the present invention. A typical harness system employs woven fabric webbing to create strong yet flexible restraints for the child safety seat 10. The present invention requires that the straps be flexible, but the material from which the straps and belts are made can vary.

Figure 2:
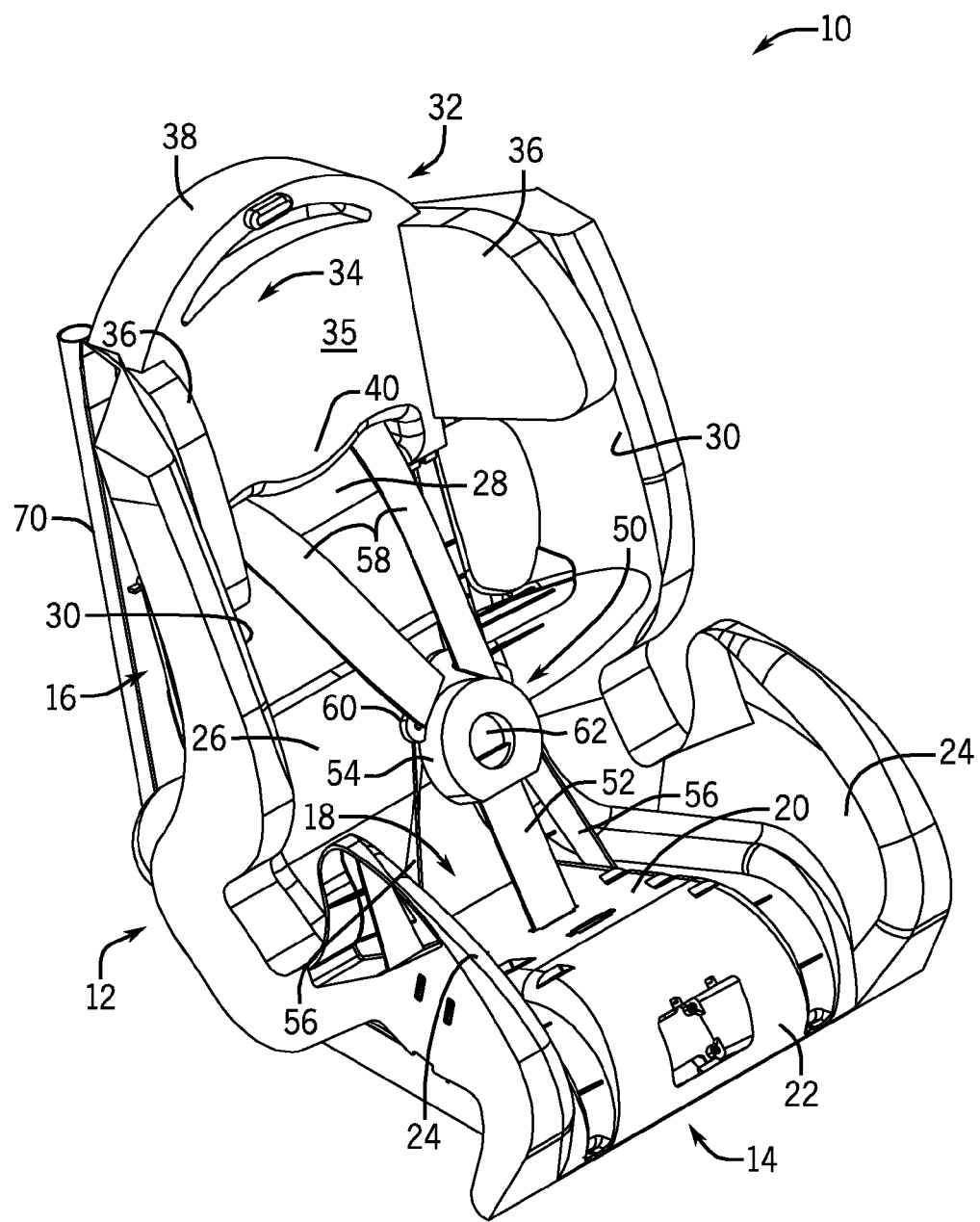
FIG. 2 shows a perspective view of the child safety seat in FIG. 1 and with the harness system adjusted to a minimum height.

With reference to FIGS. 1 and 2, the headrest 32 in this example is height adjustable on the child safety seat 10. FIG. 1 shows the headrest 32 in a raised, upper most or maximum height position and FIG. 2 shows the headrest in a lowered, lower most or minimum height position. The headrest 32 can be moved vertically, i.e., raised or lowered, between the maximum and minimum height positions as selected by the caregiver or user. In one example, the headrest 32 can be latched at each of the raised or lowered positions on the child car seat 10. In this example, the headrest 32 can also be selectively latched at one or more intermediate height positions located between the maximum and minimum positions. However, these intermediate positions are not shown or described in any detail herein. The height of the headrest 32, including the head support section 34 and side wings 36, can be raised or lowered relative to the top side of the seat bottom 14. The height adjustability is provided in order to accommodate children of different height. A shorter child can be placed in the seat with the headrest 32 positioned at or near the lowered position depicted in FIG. 2. A taller child can be placed in the seat with the headrest 32 posited at or near the raised position shown in FIG. 1.

The mechanism or means by which the headrest can be latched, moved, and released can vary within the spirit and scope of the present invention. One example of a latch and release mechanism of the headrest 32 is disclosed and described herein for illustrative purposes. As shown in FIG. 3, the child safety seat 10 can have a structural framework, and in this example that framework includes a support 70 coupled to each side of the seat back 16. A riser or headrest mount 72 is attached to each of the supports 70 in this example. The risers 72 are oriented vertically and are open or hollow rectangular tubes. The headrest 32 has a pair of posts 74 positioned on either side of the support section 34. Each of the posts telescopically engages one of the headrest mounts or risers 72. The headrest 32 is slidable upward or downward, i.e., generally vertically, as represented in FIGS. 1 and 2 relative to the risers 72.

The supports 70 or other like structures can be provided as part of the seat back 16 instead of as part of a structural framework of the seat. Similarly, the risers 72 can be provided as part of the seat back 16, as part of the seat framework, or as separate components connected to one or the other of the seat back or the framework. Similarly, the posts 74 can be integrally formed as part of the headrest structure or can be separate components attached to the headrest 32. In addition, other mechanisms can replace the telescopic sliding arrangement disclosed herein for creating relative motion between the seat back and headrest. Each of the seat shell 12 and the headrest 32 can employ steel reinforcement or other strength enhancing materials and constructions within the structure, if desired. Also, the framework of the seat, including the supports 70, can also be formed of steel or other suitable materials. The strength enhancements can be employed in order to assure the seat can withstand loads applied during use, some of which may be applied by the harness system, which is discussed in greater detail below.

A latch and release mechanism is incorporated into the headrest 32 in this example. The mechanism has an actuator 76 that projects forward from the front surface 35 on the headrest. The actuator 76 in this example is positioned near the top 38 of the headrest and can be easily accessed and manipulated by one hand of a user. The mechanism in this example also includes a pair of links 78 coupled to and extending from the actuator. Each link extends through a hollow interior or track within the headrest 32 and down through a respective one of the posts 74. The proximal ends of the links 78 can be coupled to the actuator 76 in a variety of ways as will be discussed only briefly below.

The distal or remote end of each link 78 is connected to part of a corresponding latch 80. Each latch 80 in this example is carried on and housed within a corresponding one of the posts 74. An array of vertically spaced holes 82 is formed in each of the headrest mounts or risers 72. The holes in this example are formed on an inner facing side of the risers and define selectable headrest positions. In this example, each latch 80 is pivotable about a hub or pivot axis 84 and has an arm 86 that projects radially outward and upward from the hub. A catch projection or pawl 88 protrudes from a free end of the arm on each latch 80 in a direction perpendicular to the hub axis. As shown in FIGS. 3 and 4, the pawls 88 can project or extend into a selected one of the holes 82 on each side of the headrest 32 in a latched position whereby the headrest is secured in a selected vertical height position on the safety seat 10.

Each of the latches 80 has a release lever 90 that is oriented at about a 90° angle from the arm 86 and that extends radially from the pivot hub or axis 84. In this example, the link 78 on each side of the headrest contacts the release lever 90 on a respective latch 80. A spring 92 (shown generically in FIG. 4 biasing the release lever 90) can bias each latch 80 toward the latched position shown in FIGS. 3 and 4. In order to release the latches 80 and move the headrest 32, one can depress or otherwise actuate the actuator 76. The actuator in turn will push the links 78 outward and downward to drive the distal or remote ends downward. The downward movement of the links 78 pushes down on the release levers 90 against the bias of the springs 92. Rotation of the latches 80 rotates the pawls 88 to a released position withdrawn from one of the holes 82 in the risers as depicted in phantom in FIG. 4. With the latches 80 released, a user is free to raise or lower the headrest 32 to another selected position and pair of holes 82 along the risers. When the actuator 76 is released, the springs 92 in this example return the pawls 88 to the latched position whereby the pawls will seat in another of the holes 82.

As will be evident to those having ordinary skill in the art, the configuration and construction of the above-described latch and release mechanism can vary within the spirit and scope of the present invention. The actuator can be configured so that inward movement of the actuator creates opposite outward movement of the two links 78. Alternatively, the actuator can be a pull-type actuator, a pivoting actuator, a slide actuator, or the like. The links 78 can be relatively rigid elements that are driven longitudinally in opposite directions by movement of the actuator. In one example, the actuator can include a pair of wedges, ramped surfaces, or cams in order to move the substantially rigid links. In another example, the links can be push-pull cables or pull-only or one-way cables that actuate the latches 80. In another example, the actuator can include a separate biasing element or spring that biases the actuator to a latched position. The springs 92 can be replaced or supplemented by alternate biasing elements, such as a torsion spring on the hub or pivot axis 84, a spring biasing the arm 86, or the like, on each latch 80. The latches 80 and the relative motion thereof can also vary from the example shown and described herein. The latches 80 can be inverted so that an upward pull moves a portion of each latch and withdraws the pawls 88 or releases another latching component of the latches. Other mechanisms may also be utilized in place of the latches 80, links 78, and actuator 76 for securing and releasing the headrest 32 at a selected height.

Figure 5:
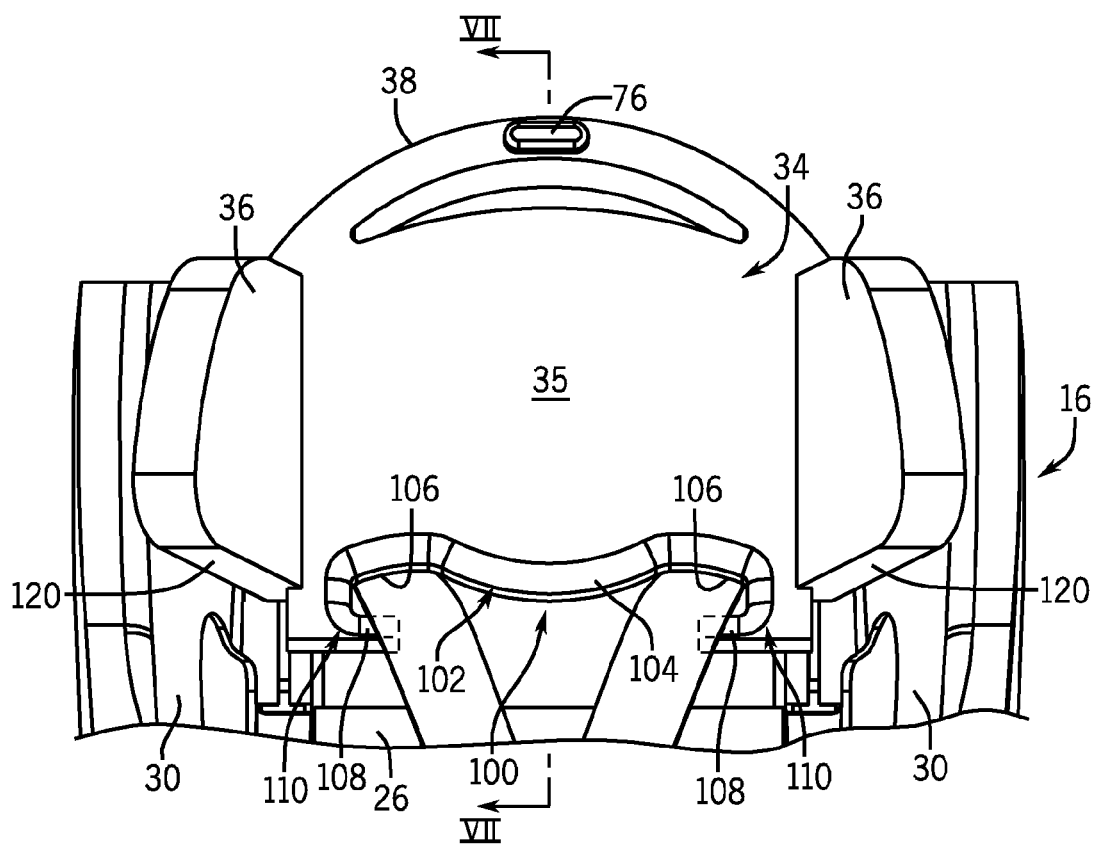
FIG. 5 shows a front view of an upper portion of the child safety seat shown in FIG. 2.
Figure 6:
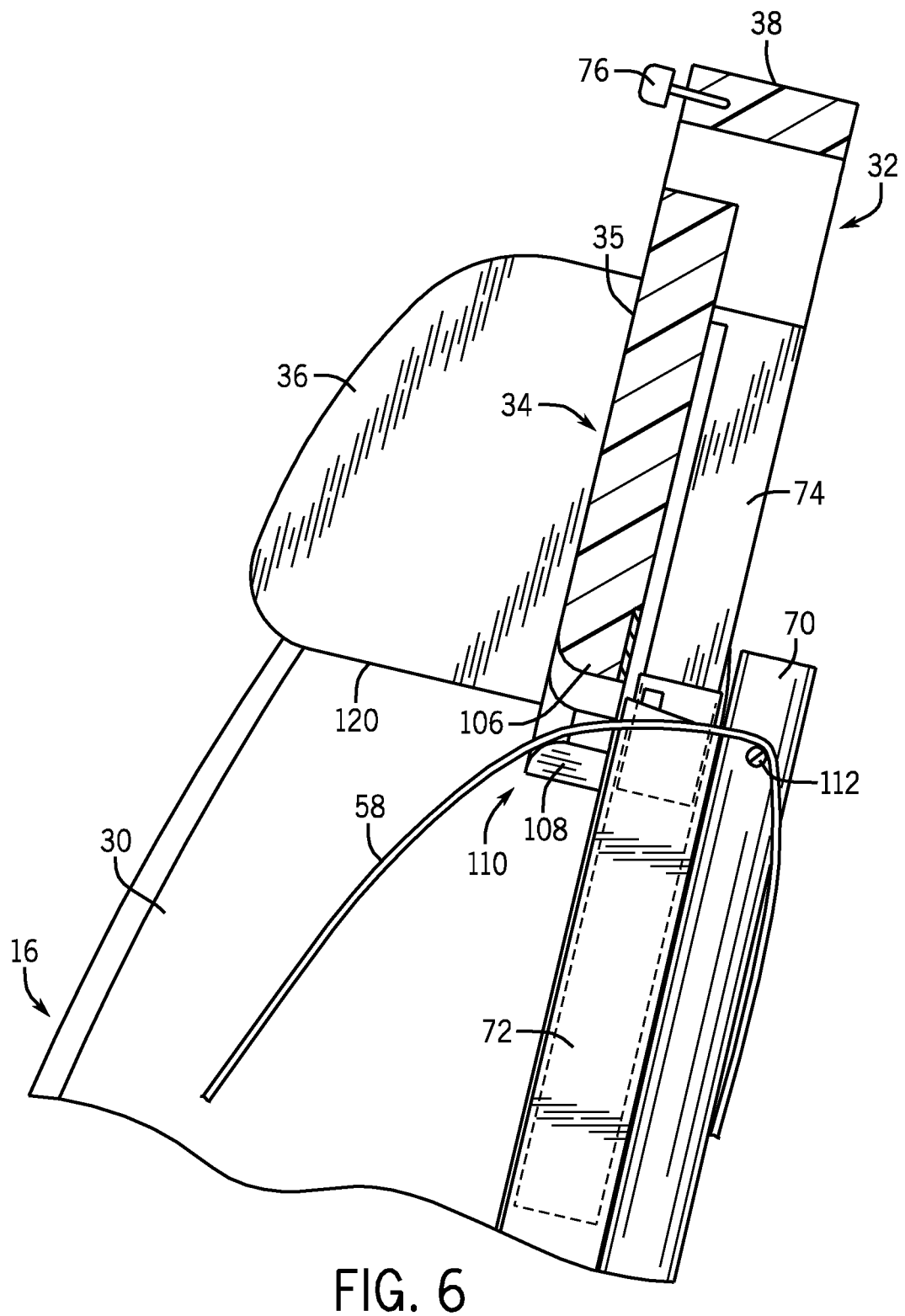
FIG. 6 shows a cross-section along line VI-VI of the child safety seat shown in FIG. 1.
Figure 7:
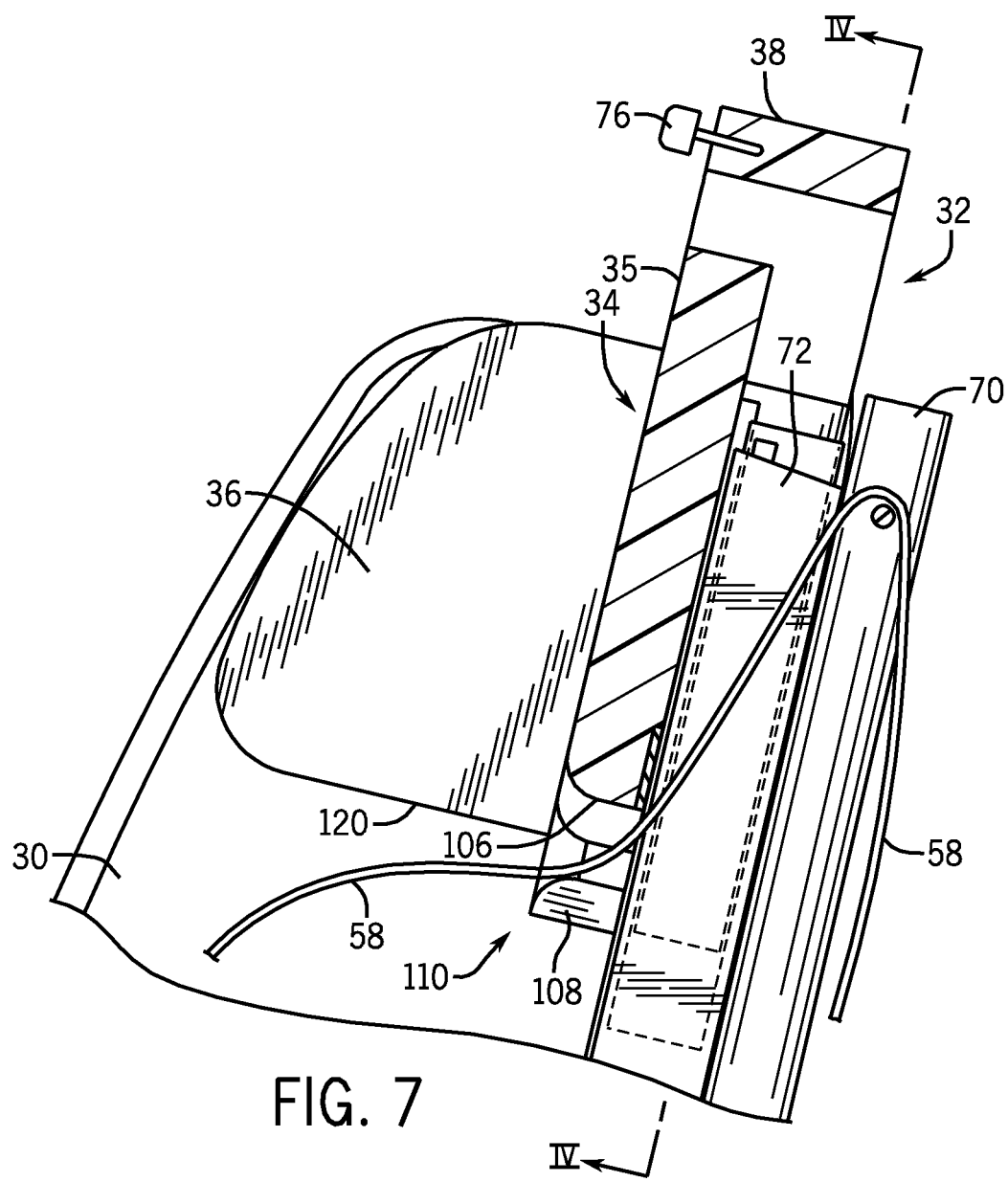
FIG. 7 shows a cross-section along line VII-VII of the child safety seat shown in FIG. 5.

With reference to FIGS. 5-7, details of the harness height adjustment and harness routing are now described. As shown in FIG. 5, the bottom 40 or lower edge of the headrest 32 in this example defines a strap guide region 100. In this example, the strap guide region 100 defines a front strap guide and includes a contoured bottom edge or profile edge 102 on the bottom 40 of the headrest 32. The contoured edge 102 has a mid-section 104 that protrudes further downward than two scalloped or recessed sections 106, which flank the mid-section. A pair of bosses 108 or fingers is spaced apart and opposes one another on the bottom 40 of the headrest 32. Each boss 108 or finger defines a strap or belt positioner as described below. The bosses 108 in this example extend toward one another. Each boss 108 is positioned under and spaced from a respective one of the recessed sections 106 on the contoured edge 102. The gap between the two bosses 108 renders the strap guide region 100 as an open slot on the bottom 40 of the headrest. In this example, each of the bosses 108, in combination with the corresponding scalloped or recessed sections 106, forms a strap guide 110, one for each of the shoulder straps 58 on the harness system 50. For reasons discussed in greater detail below, each of the shoulder straps 58 can be removably received within a respective one of the strap guides 110 through the gap between the bosses 108. Each of the straps 58 rests on the corresponding boss 108 as shown in FIG. 5. Each of the strap guides 110 in this example captures and guides a respective one of the shoulder straps 58 without having the straps being attached, interlocked, linked, or otherwise connected to the headrest 32.

As shown in FIGS. 3 and 6, a belt router 112 is positioned on the seat back 16 and defines a rear strap guide. In this example, the belt router 112 is a rod or bar that extends laterally across and behind the seat back 16 between the pair of supports 70. Each of the shoulder straps 58 is routed from the back side of the seat back 16 over the belt router 112 in this example and is directed toward the front facing side 26 on the seat back. The shoulder strap 58 can be directed over a top end 114 of the seat back 16 as shown. Alternatively, the straps 58 can be routed through large openings near the top end of the seat back. As shown in FIG. 6, the shoulder straps 58 are directed or routed beneath the bottom 40 of the headrest 32. In this example, the straps 58 can be selectively routed under the recessed regions 106, within the strap guides 110, and over the bosses 108 as shown in FIG. 5. In this position, the shoulder straps 58 can bear against the bosses 108, the recessed sections 106 of the contoured edge 102, or both, depending on the position of the headrest 32.

FIG. 6 depicts the headrest 32 in the raised or upper most position represented in FIG. 1. The pawls 88 on the latches 80 can seat in the upper most pair of the holes 82 on the risers 72 in this position. The harness height position or shoulder strap position in this example is defined by the elevation of the strap guides 110 on the headrest 32. The shoulder straps 58 are directed by the belt router 112 toward the front facing side 26 of the seat back and through the strap guides 110 in the headrest. The strap portion of the shoulder straps 58 positioned forward of the front facing side 26 and protruding from the strap guides 110 define a usable portion of the straps. Repositioning the headrest alters the length of the usable portion. Any part of the straps 58 located behind the headrest and above the elevation of the seat guides 110 is unusable in this example.

In order to adjust the harness height, i.e., the height of the shoulder straps 58, from the maximum height of FIG. 6, a user need only depress the actuator 76 to release the latches 80 and permit moving the headrest 32 downward. FIG. 7 shows the headrest 32 in the lowered, lower most, or minimum height position represented in FIG. 2. As can be seen in this example, the belt router 112 remains at a stationary or fixed elevation whereas the headrest inclusive of the strap guides 110 has moved downward relative to the seat back. As a result of this motion, the shoulder straps 58 are redirected forward and downward relative to the front facing side 26 of the seat back before clearing the headrest. This lower height is based on the position of the strap guides 110. Essentially, the headrest 32 pushes down on the shoulder straps 58 and sandwiches or captures an unusable portion of the straps between the headrest and the seat back as depicted in FIG. 7. The height of the shoulder straps 58 is thus determined by the height of the headrest 32. By raising or lowering the headrest 32, the shoulder strap position is also raised or lowered and the usable portion of the straps is increased or reduced.

The configuration and construction of the strap guide region 100 inclusive of the strap guides 110 permits a user to disengage the shoulder straps 58 from the headrest 32. The straps 58 can be disengaged from the headrest 32 simply by moving the straps in a lateral direction, releasing the straps from the strap guides 110. In one example, the straps 58 can be moved inward, as in this example to clear the bosses 108. This can be done by pulling the straps inward toward one another and dropping the straps through the gap between the bosses 108. When this is done, the user can raise or lower the headrest without effecting the belt tension or strap tension of the harness system. This can allow a user to remove the headrest and/or the headrest soft goods without having to deal with removing the harness system 50. The user can wash the headrest soft goods or repair the headrest very easily and without having to disengage or remove any portion of the harness system 50, other than by disassociating the straps from the headrest guide region. The shoulder straps 58 are routed under or beneath the headrest 32 instead of through closed apertures or slots in the headrest, which would otherwise permanently connect or attach the straps to the headrest. The harness system 50 can also be removed from the child safety seat 10 in this example for cleaning or when no longer needed. The headrest can be moved upward to the raised position with the straps disengaged from the guide section 100 of the headrest. In this position, a large opening can be created between the headrest 32 and the top end 114 on the seat back 16. The harness system 50 can then be easily and readily detached from the seat and slipped through the opening or gap as needed. Also in this example, a user can adjust the height of the headrest and the harness system with only one hand. The user need only actuate the actuator and raise or lower the headrest in order to accomplish both functions.

During manufacture of the disclosed child's safety seat 10, assembly is made easier because the shoulder strap routing does not require one to fish or thread the webbing of the straps through closed or small apertures. This is particularly true if the shoulder straps 58 are simply routed over the top end 114 of the seat back 16 from behind the headrest 32.

The disclosed child safety seat 10 can also be utilized as a conventional booster, whereby the seat is integrated with a vehicle safety harness. The dedicated harness system, 50 is no longer needed in the car seat mode. As noted above the harness system 50 can be easily removed from the seat shell 12.

The headrest 32 can be replaced with an optional headrest that includes conventional C-shaped shoulder belt guides for routing the vehicle's shoulder belt. Alternatively, though not shown herein, the headrest 32 can also be provided with the pair of conventional C-shaped shoulder belt guides on the underside surface 120 on each of the side wings 36. The vehicle's shoulder belt can be routed through the selected C-shaped guide as is known.

In the disclosed example, the belt router 112 can also vary in configuration and construction from the example shown. In one example, the belt router 112 can be replaced by a plastic structure or other structures, one for each of the straps 58, to perform the same function. In another example, the top end 114 of the seat back 16 can be configured with or as the device or means to provide the rear routing function. The strap guide region 100 on the headrest 32 provides the second, front belt routing function in accordance with the teachings of the present invention and can also vary from the example shown. In one example, the strap guide region can simply be the bottom end of the headrest 32. The headrest 32 can be provided without any contoured edge 102, and instead can simply bear against the straps 58 and reposition the strap height depending on the position of the headrest.

In this example, the headrest 32 provides a front guiding function for the shoulder straps 58 and the belt router 112 provides a rear guiding function for the straps 58. By maintaining the rear guiding function, i.e., the belt router 112 in this example, at a fixed height, the headrest can be raised or lowered to adjust the shoulder strap height without the user having to then readjust the belt tension. The straps are simply rerouted and not lowered in their entirety, which would otherwise require the strap tension to be readjusted.

Although shown and described herein in connection with a child safety seat 10 in the form of a car seat, the disclosed harness height adjustment solution may be applied to a variety of child seating devices or juvenile products on which belts, straps or other webbing arrangements are utilized. Such seats can be considered child safety seats within the context of the present invention if such seats employ an integrated, adjustable harness and headrest as described herein. In each case, the harness system may be used or employed at a given height and then conveniently adjusted via raising or lowering the headrest to maintain an appropriate shoulder height position for a child seated in the seat.

Although certain harness height adjustment components, systems, and methods have been described herein in accordance with the teachings of the present disclosure, the scope of coverage of this disclosure is not limited thereto. On the contrary, this disclosure covers all embodiments of the teachings of the disclosure that fairly fall within the scope of permissible equivalents.

What is claimed is:

1. A child safety seat comprising:
   a seat back having an upper end, a lower end, a back side, and a front facing side;
   a seat harness having a pair of shoulder straps each having a strap portion positioned forward of and extending along the front facing side of the seat back;
   a headrest coupled to the seat back near the upper end and having a bottom, the vertical position of the headrest being selectively adjustable relative to the seat back between a raised position and a lowered position; and
   a strap router on and positioned above a top end of the seat back directing the pair of shoulder straps from the back side toward the front facing side,
   wherein the pair of shoulder straps is directed under the bottom of the headrest, and wherein, by selectively adjusting the vertical position of the headrest, the bottom of the headrest adjusts the vertical position of the pair of shoulder straps on the front facing side of the seat back by increasing or decreasing the useable length of the strap portions, and wherein the strap router is a bar that extends between a pair of seat frame supports on the back side of the seat back.

2. A child safety seat comprising:

a seat back having an upper end, a lower end, a back side, and a front facing side;

a seat harness having a pair of shoulder straps each having a strap portion positioned forward of and extending along the front facing side of the seat back;

a headrest coupled to the seat back near the upper end and having a bottom, the vertical position of the headrest being selectively adjustable relative to the seat back between a raised position and a lowered position;

a strap router on the seat back directing the pair of shoulder straps from the back side toward the front facing side; and a strap guide region on the bottom of the headrest with a contoured profile defining a pair of upwardly recessed sections flanking a depending mid-section, wherein the pair of shoulder straps is directed under the bottom of the headrest, and wherein, by selectively adjusting the vertical position of the headrest, the bottom of the headrest adjusts the vertical position of the pair of shoulder straps on the front facing side of the seat back by increasing or decreasing the useable length of the strap portions.

3. A child safety seat comprising:

a seat back having an upper end, a lower end, a back side, and a front facing side;

a seat harness having a pair of shoulder straps each having a strap portion positioned forward of and extending along the front facing side of the seat back;

a headrest coupled to the seat back near the upper end and having a bottom, the vertical position of the headrest being selectively adjustable relative to the seat back between a raised position and a lowered position;

a strap router on the seat back directing the pair of shoulder straps from the back side toward the front facing side; and a pair of strap guides positioned laterally spaced apart from one another on the bottom of the headrest, each strap guide having a boss spaced from and under an upward recess in the bottom of the headrest, the bosses protruding laterally inward toward one another with a gap therebetween, wherein the pair of shoulder straps is directed under the bottom of the headrest, and wherein, by selectively adjusting the vertical position of the headrest, the bottom of the headrest adjusts the vertical position of the pair of shoulder straps on the front facing side of the seat back by increasing or decreasing the useable length of the strap portions.

4. A child safety seat comprising:

a seat back having an upper end, a lower end, and a front facing side;

a seat harness having a pair of shoulder straps each with a strap portion extending along the front facing side;

a headrest coupled to the seat back near the upper end and having a bottom and a strap guide region on the bottom, the vertical position of the headrest being selectively adjustable relative to the seat back between a raised position and a lowered position, the strap guide region having a pair of bosses spaced from a bottom surface of the headrest, the pair of bosses extending toward one another but having a gap therebetween, the pair of shoulder straps being routed over a corresponding one of the pair of bosses; and a strap router on the seat back directing the pair of shoulder straps from the back side toward the front facing side of the seat back, wherein the pair of shoulder straps is routed to the strap guide region whereby selectively adjusting the vertical position of the headrest adjusts the vertical position of the pair of shoulder straps on the front facing side, and wherein the pair of shoulder straps can be optionally moved laterally and downwardly out of engagement with part of the strap guide region to selectively allow raising the headrest independent of the pair of shoulder straps.

5. A child safety seat according to claim 4, wherein the strap guide region includes a contoured surface with a pair of spaced apart upward recessed sections, one each positioned above a corresponding one of the pair of bosses.

6. A child safety seat according to claim 4, wherein the seat back has a back side and the strap router is positioned near the upper end of the seat back on the back side.

7. A child safety seat according to claim 4, wherein the strap router is a bar extending laterally across a back side of the seat back.

8. A child safety seat according to claim 4, wherein the headrest is adjustable to one or more intermediate positions between the raised and lowered positions.

9. A child safety seat comprising:

a seat back having an upper end, a lower end, and a front facing side;

a seat harness having a pair of shoulder straps each with a strap portion extending along the front facing side;

a headrest coupled to the seat back near the upper end and having a bottom and a strap guide region on the bottom, the vertical position of the headrest being selectively adjustable relative to the seat back between a raised position and a lowered position, the strap guide region including a contoured surface on the bottom of the headrest; and a strap router on the seat back directing the pair of shoulder straps from the back side toward the front facing side of the seat back, wherein the contoured surface has a depending mid-section and a pair of upward recesses flanking the mid-section, and wherein the pair of shoulder straps is routed to the strap guide region whereby selectively adjusting the vertical position of the headrest adjusts the vertical position of the pair of shoulder straps on the front facing side, and wherein the pair of shoulder straps can be optionally moved laterally and downwardly out of engagement with part of the strap guide region to selectively allow raising the headrest independent of the pair of shoulder straps.

10. A child safety seat comprising:

a seat back having an upper end, a lower end, and a front facing side;

a seat harness having a pair of shoulder straps each with a strap portion extending along the front facing side;

a headrest coupled to the seat back near the upper end and having a bottom and a strap guide region on the bottom, the vertical position of the headrest being selectively adjustable relative to the seat back between a raised position and a lowered position; and a strap router on the seat back directing the pair of shoulder straps from the back side toward the front facing side of the seat back, wherein the strap router directs the pair of shoulder straps over a top end of the seat back and under the bottom of the headrest, and wherein the pair of shoulder straps is routed to the strap guide region whereby selectively adjusting the vertical position of the headrest adjusts the vertical position of the pair of shoulder straps on the front facing side, and wherein the pair of shoulder straps can be optionally moved laterally and downwardly out of engagement with part of the strap guide region to selectively allow raising the headrest independent of the pair of shoulder straps.

11. A height adjustable harness system for a juvenile product having a seat, the height adjustable harness system comprising:

a seat back having an upper end, a lower end, and a front facing side;

a seat harness having a pair of shoulder straps each with a portion positioned forward of and extending along the front facing side of the seat back;

a headrest coupled to the seat back near the upper end and having a bottom, the vertical position of the headrest being selectively adjustable relative to the seat back between a raised position and a lowered position; and a strap router positioned above a top end of the seat back and maintained at a fixed elevation relative to the seat back and directing the pair of shoulder straps toward the front facing side, wherein the pair of shoulder straps is routed under the bottom of the headrest, and wherein, by selectively adjusting the vertical position of the headrest, the bottom of the headrest adjusts the maximum useable height of the pair of shoulder straps on the front facing side of the seat back.

* * * * *